(12) United States Patent
Masuma et al.

(10) Patent No.: US 9,771,858 B2
(45) Date of Patent: Sep. 26, 2017

(54) ENGINE SYSTEM CONTROL APPARATUS AND VEHICLE

(71) Applicant: Fuji Jukogyo Kabushiki Kaisha, Tokyo (JP)

(72) Inventors: Tetsuro Masuma, Tokyo (JP); Tazuki Watanabe, Tokyo (JP); Hiroshi Kato, Tokyo (JP)

(73) Assignee: Subaru Corporation, Tokyo (JP)

( * ) Notice: Subject to any disclaimer, the term of this patent is extended or adjusted under 35 U.S.C. 154(b) by 7 days.

(21) Appl. No.: 14/945,217

(22) Filed: Nov. 18, 2015

(65) Prior Publication Data

US 2016/0153353 A1 Jun. 2, 2016

(30) Foreign Application Priority Data

Nov. 28, 2014 (JP) ................................. 2014-241152

(51) Int. Cl.
*F02B 37/24* (2006.01)
*F02D 41/00* (2006.01)
(Continued)

(52) U.S. Cl.
CPC .............. *F02B 37/24* (2013.01); *F02B 33/44* (2013.01); *F02D 23/02* (2013.01);
(Continued)

(58) Field of Classification Search
CPC .. F02B 37/24; F02B 2037/125; F02D 41/021; F02D 41/0225; F02D 41/007;
(Continued)

(56) References Cited

U.S. PATENT DOCUMENTS 7,322,194 B2 * 1/2008 Sun ...................... F02B 37/013
123/568.11
8,352,152 B2 * 1/2013 Serres ................. F04D 27/0207
123/330
(Continued)

FOREIGN PATENT DOCUMENTS

JP 2003-201849 A 7/2003
JP 2006-183558 A 7/2006
(Continued)

OTHER PUBLICATIONS

JPO Decision to Grant dated Aug. 2, 2016.
(Continued)

*Primary Examiner* — Phutthiwat Wongwian
*Assistant Examiner* — Jason T Newton
(74) *Attorney, Agent, or Firm* — McGinn IP Law Group, PLLC

(57) ABSTRACT

An engine system is mounted on a vehicle and includes an engine and a turbocharger. The engine system control apparatus includes: a driving state identifier that identifies a driving state of the vehicle from a plurality of driving states; a surge determiner that determines whether a surge condition as a condition under which a surge noise is generated is satisfied, based on the identified driving state of the vehicle and an operating state of the engine; and a variable nozzle controller that controls, based on the identified driving state of the vehicle and the operating state of the engine, an opening degree of a variable nozzle of the turbocharger to be varied in an open direction, upon determination by the surge determiner that the surge condition is satisfied.

17 Claims, 6 Drawing Sheets

(51) Int. Cl.
  *F02D 41/30* (2006.01)
  *F02D 41/02* (2006.01)
  *F02D 41/10* (2006.01)
  *F02D 23/02* (2006.01)
  *F02M 26/05* (2016.01)
  *F02B 33/44* (2006.01)
  *F02B 37/12* (2006.01)

(52) U.S. Cl.
  CPC ....... *F02D 41/0007* (2013.01); *F02D 41/021* (2013.01); *F02D 41/023* (2013.01); *F02D 41/0225* (2013.01); *F02D 41/10* (2013.01); *F02D 41/3005* (2013.01); *F02M 26/05* (2016.02); *F02B 2037/125* (2013.01); *F02D 2200/0406* (2013.01); *F02D 2200/501* (2013.01); *F02D 2200/502* (2013.01); *Y02T 10/144* (2013.01)

(58) Field of Classification Search
  CPC .... F02D 41/3005; F02D 41/023; F02D 41/10; F02D 23/02; F02D 2200/0406; F02D 2200/501; F02D 2200/502; F02M 26/05; Y02T 10/144
  USPC .......................................................... 60/601
  See application file for complete search history.

(56) References Cited

U.S. PATENT DOCUMENTS

| | | | | |
|---|---|---|---|---|
| 2003/0121263 | A1* | 7/2003 | Hidaka | F02B 37/24 60/602 |
| 2006/0137660 | A1 | 6/2006 | Shirakawa et al. | |
| 2008/0110169 | A1* | 5/2008 | Roh | F02B 37/24 60/600 |
| 2009/0283076 | A1* | 11/2009 | Aoki | F02D 9/101 123/568.11 |
| 2011/0209690 | A1* | 9/2011 | Ulrey | F02D 41/0007 123/564 |
| 2012/0042632 | A1* | 2/2012 | Inoue | F01N 3/0256 60/274 |
| 2012/0060479 | A1* | 3/2012 | Tsukamoto | F02D 41/0005 60/278 |
| 2012/0137675 | A1* | 6/2012 | Ito | F02D 41/0007 60/602 |
| 2016/0222894 | A1* | 8/2016 | Hagari | F02D 41/0007 |

FOREIGN PATENT DOCUMENTS

| | | |
|---|---|---|
| JP | 2009-156197 A | 7/2009 |
| JP | 2009-243449 A | 10/2009 |
| JP | 2009-281144 A | 12/2009 |
| JP | 2010-174813 A | 8/2010 |
| JP | 2011-256743 A | 12/2011 |
| JP | 2015-028309 A | 2/2015 |
| WO | WO 2012/073365 A1 | 6/2012 |

OTHER PUBLICATIONS

JPO Notification of Refusal dated Apr. 26, 2016.
Japanese Office Action dated Apr. 26, 2016 with an English translation thereof.

* cited by examiner

ENGINE SYSTEM CONTROL APPARATUS AND VEHICLE

CROSS-REFERENCE TO RELATED APPLICATIONS

The present application claims priority from Japanese Patent Application No. 2014-241152 filed on Nov. 28, 2014, the entire contents of which are hereby incorporated by reference.

BACKGROUND

The technology relates to an engine system control apparatus that suppresses generation of a surge noise in an engine system provided with a turbocharger, and to a vehicle that includes the engine system control apparatus.

A turbocharger has been employed in an engine system to increase fluidity of intake air and thereby to improve acceleration performance and combustion efficiency, i.e., fuel efficiency. Also, providing a variable nozzle, which varies the flow passage area of exhaust gas, at an exhaust gas flow passage of a turbine in the turbocharger makes it possible to achieve a high supercharging pressure even when the exhaust gas is low in flow rate.

On the other hand, a surge noise may be generated when an accelerator is released suddenly upon a supercharging operation. To address such generation of the surge noise, Japanese Unexamined Patent Application Publication (JP-A) No. 2011-256743, JP-A No. 2009-156197, and JP-A No. 2009-281144 each disclose a technique that carries out a process of suppressing the generation of the surge noise.

SUMMARY

Depending on a driving state of a vehicle, carrying out a process of suppressing generation of a surge noise may influence any performance of a vehicle, such as, but not limited to, performance related to exhaust gas. Also, specific conditions under which the surge noise is generated vary depending on the driving state of the vehicle and an operating state of an engine. Hence, a concern is that the process may be carried out unnecessarily even in a situation where the generation of the surge noise is unlikely, or that the process may fail to be carried out even in a situation where the surge noise is bound to occur.

It is desirable to provide an engine system control apparatus that makes it possible to suppress generation of a surge noise effectively while suppressing an influence on any performance of a vehicle, and the vehicle that includes the engine system control apparatus.

An aspect of the technology provides an engine system control apparatus of an engine system. The engine system is mounted on a vehicle and includes an engine and a turbocharger. The engine includes a combustion chamber, and the turbocharger includes a turbine, a compressor, and a variable nozzle. The turbine is in communication with the combustion chamber and is rotated by exhaust gas exhausted from the combustion chamber, the compressor is rotated integrally with the turbine and pressurizes intake air to deliver the pressurized intake air to the combustion chamber, and the variable nozzle is provided in an exhaust gas flow passage of the turbine and varies flow passage area of the exhaust gas. The engine system control apparatus includes: a driving state identifier that identifies a driving state of the vehicle from a plurality of driving states; a surge determiner that determines whether a surge condition as a condition under which a surge noise is generated is satisfied, based on the identified driving state of the vehicle and an operating state of the engine; and a variable nozzle controller that controls, based on the identified driving state of the vehicle and the operating state of the engine, an opening degree of the variable nozzle to be varied in an open direction, upon determination by the surge determiner that the surge condition is satisfied.

The surge determiner may compare a parameter indicating the operating state of the engine with a predetermined value to determine whether the surge condition is satisfied, and the predetermined value may have mutually-different values that may be set according to the respective driving states of the vehicle.

The driving states of the vehicle may at least include a shift-changing state and a coast state.

The driving states of the vehicle may further include revving of the engine.

The parameter indicating the operating state of the engine may include a pressure of an intake manifold that may be in communication with the combustion chamber, and a fuel injection amount change rate of an injector that may inject a fuel into the combustion chamber, and the surge determiner may determine that the surge condition is satisfied, when the pressure of the intake manifold is equal to or greater than a predetermined pressure and the fuel injection amount change rate of the injector is equal to or greater than a predetermined change rate.

The predetermined pressure may have mutually-different values that may be set according to the number of revolutions of the engine.

The predetermined change rate may have mutually-different values that may be set according to the pressure of the intake manifold.

DETAILED DESCRIPTION

Figure 1:
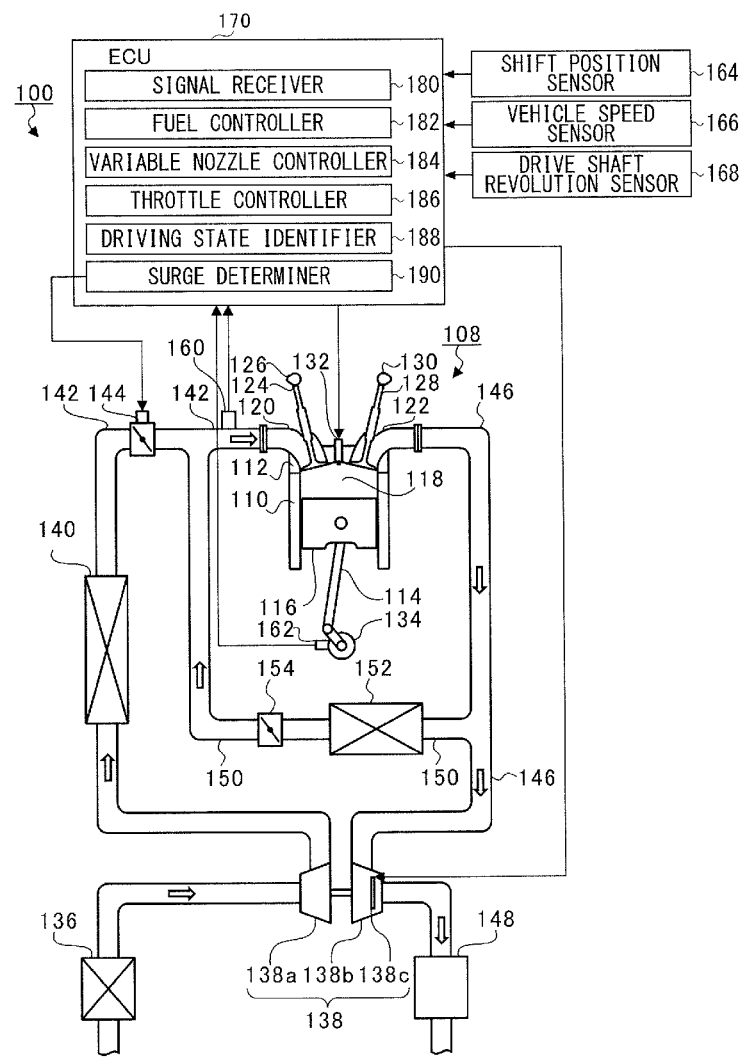
FIG. 1 describes a schematic configuration of an engine system.

In the following, some preferred implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Throughout the present specification and the drawings, elements having substantially the same function and configuration are denoted with the same reference numerals to avoid any redundant description. Also, elements that are not directly related to the technology are unillustrated in the drawings.

[Engine System 100]

FIG. 1 describes a schematic configuration of an engine system 100. A description is given here with reference to an in-cylinder direct injection four-cylinder diesel engine as a non-limiting example of an engine 108 as illustrated in FIG. 1, in which a flow of a fluid is each denoted by a white arrow. For example, the engine 108 may be mounted on a vehicle, and may supply the vehicle with driving force. The engine 108 may include a cylinder block 110, a cylinder head 112, and a piston 116. The cylinder head 112 may be provided at an upper part of the cylinder block 110. The piston 116 may be so supported by a connecting rod 114 as to be slidable inside the cylinder block 110. A space surrounded by the cylinder block 110, the cylinder head 112, and a top surface of the piston 116 may form a combustion chamber 118.

An intake manifold 120 and an exhaust manifold 122 each may be so provided at the cylinder head 112 as to be in communication with the combustion chamber 118. An intake valve 124 may have a leading end located between the intake manifold 120 and the combustion chamber 118, and the other end that may be in contact with an intake valve cam 126. Rotation of the intake valve cam 126 may open and close the communication between the intake manifold 120 and the combustion chamber 118. An exhaust valve 128 may have a leading end located between the exhaust manifold 122 and the combustion chamber 118, and the other end that may be in contact with an exhaust valve cam 130. Rotation of the exhaust valve cam 130 may open and close the communication between the exhaust manifold 122 and the combustion chamber 118.

An injector (a fuel injection valve) 132 may be so provided at the cylinder head 112 that a leading end thereof is located inside the combustion chamber 118, and may inject a fuel into the combustion chamber 118. The combustion chamber 118 may cause spontaneous ignition as a result of a contact of the fuel injected from the injector 132 with air compressed and heated by the piston 116, thereby reciprocating the piston 116. The reciprocating movement of the piston 116 is converted into a rotary movement of a crank shaft 134 through the connecting rod 114.

Air having passed through an air cleaner 136 and having been compressed by a compressor 138a of a turbocharger 138 may be cooled by an inter cooler 140, following which the cooled air may flow into the intake manifold 120 from an intake pipe 142 to be supplied to the combustion chamber 118 of the engine 108. A throttle valve 144 may be provided in the intake pipe 142, and may adjust a flow passage width, i.e., an opening degree, of the intake pipe 142 to control a flow rate of the intake air.

An exhaust pipe 146 may be in communication with the exhaust manifold 122. Exhaust gas that flows through the exhaust pipe 146 may rotate the turbine 138b of the turbocharger 138 coupled to the exhaust pipe 146, following which the exhaust gas may be purged by a catalytic unit 148 containing a catalyst to be emitted to the outside.

The compressor 138a rotates integrally with the turbine 138b in the turbocharger 138. Such rotation of the compressor 138a pressurizes the intake air, causing supercharged air to be delivered to the combustion chamber 118 of the engine 108. The thus-configured turbocharger 138 increases fluidity of the intake air, making it possible to improve acceleration performance and combustion efficiency, i.e., fuel efficiency.

Also, the implementation employs a variable nozzle turbo (VNT) as the turbocharger 138. Hence, a variable nozzle 138c provided in an exhaust gas flow passage in a housing of the turbine 138b varies the flow passage area, i.e., an opening degree, of the exhaust gas to adjust a supercharging pressure.

An exhaust gas recirculation (EGR) flow passage 150 may bring a part of the exhaust pipe 146 upstream of the turbine 138b into communication with a part of the intake pipe 142 downstream of the throttle valve 144. The EGR flow passage 150 may be provided with an EGR cooler 152, allowing the exhaust gas cooled by the EGR cooler 152 to be recirculated into the combustion chamber 118 together with the intake air cooled by the inter cooler 140. An EGR valve 154 may be provided in the EGR flow passage 150, and may adjust a flow passage width of the EGR flow passage 150 to control a flow rate of the exhaust gas to be recirculated into the combustion chamber 118. Supplying the exhaust gas to the combustion chamber 118 together with the intake air lowers an oxygen concentration and thereby decreases a combustion temperature of the fuel, making it possible to suppress generation of nitrogen oxides (NOx) or other oxides.

An intake manifold pressure sensor 160 may detect a pressure of the intake manifold 120 (hereinafter simply referred to as an "intake manifold pressure"). A crank angle sensor 162 may detect a crank angle of the crank shaft 134. A shift position sensor 164 may detect a shift position of a transmission to which an output of the engine 108 is transmitted. A vehicle speed sensor 166 may detect a speed of the vehicle. A drive shaft revolution sensor 168 may detect the number of revolutions of a drive shaft of the vehicle. Those sensors each may be coupled to an engine control unit (ECU) 170, and each may output a signal indicating a detection value to the ECU 170.

The ECU 170 may be a microcomputer that includes devices such as, but not limited to, a central processing unit (CPU), ROM in which programs, etc., are stored, and RAM that serves as a work area, and may perform an overall control of the engine 108 as a whole. The ECU 170 may be coupled to the injector 132, the variable nozzle 138c, and the throttle valve 144, and may supply a command signal to each of them. The ECU 170 may function as a signal receiver 180, a fuel controller 182, a variable nozzle controller 184, a throttle controller 186, a driving state identifier 188, and a surge determiner 190 as well. A description is given of such functional units in detail below.

The signal receiver 180 may acquire the signals indicating the respective detection values obtained from the intake manifold pressure sensor 160, the crank angle sensor 162, the shift position sensor 164, the vehicle speed sensor 166, and the drive shaft revolution sensor 168. The signal receiver 180 may also derive the number of revolutions of the engine 108, based on a signal indicating the crank angle acquired from the crank angle sensor 162.

The fuel controller 182 may inject the fuel, based on an accelerator opening degree (i.e., an amount of pressing down of an accelerator pedal) and with reference to a fuel injection timing map. The fuel controller 182 may inject the fuel by an amount (i.e., an injection period) corresponding to the accelerator opening degree, in a predetermined phase corresponding to the crank angle, e.g., at a predetermined angle following traveling by the piston 116 of the bottom dead center upon compression. Also, the fuel controller 182 may derive, based on a difference in injection amount of the fuel per unit time, a rate of change in the injection amount, i.e., a fuel injection amount change rate. In conjunction with such injection of the fuel, the intake valve 124 may be opened following traveling by the piston 116 of the top dead center and may be closed following traveling by the piston 116 of the bottom dead center upon intake, in response to the rotation of the intake valve cam 126. The exhaust valve 128 may be opened following traveling by the piston 116 of the bottom dead center and may be closed following traveling by the piston 116 of the top dead center upon exhaust, in response to the rotation of the exhaust valve cam 130.

The variable nozzle controller 184 may adjust an opening degree of the variable nozzle 138c to vary the flow passage area of the exhaust gas, and may thereby control a flow velocity of the exhaust gas to be introduced into a turbine wheel. Such a configuration including the variable nozzle 138c and the variable nozzle controller 184 makes it possible to increase a rotation speed of each of the turbine 138b and the compressor 138a irrespective of the flow velocity of the exhaust gas in the exhaust pipe 146. This in turn makes it possible to increase a pressure at an outlet of the compressor 138a, i.e., makes it possible to increase a pressure (or an intake pressure) of the intake air to be introduced into the combustion chamber 118.

The throttle controller 186 may adjust an opening degree of the throttle valve 144 to control the flow rate of the intake air. The throttle controller 186 may usually maintain the throttle valve 144 in an opened state, in view of a diesel engine which does not necessarily require adjustment of an air-fuel ratio. However, the throttle controller 186 may narrow down the throttle valve 144 to an opening degree that is based on the number of revolutions of the engine 108 to increase a temperature of the exhaust gas, under a situation in which combustion and regeneration of particulates in a diesel particulate filter (DPF) are to be performed, or an amount of NOx is to be reduced by increasing a flow rate in the EGR flow passage 150 immediately after starting of the engine 108.

Figure 2:
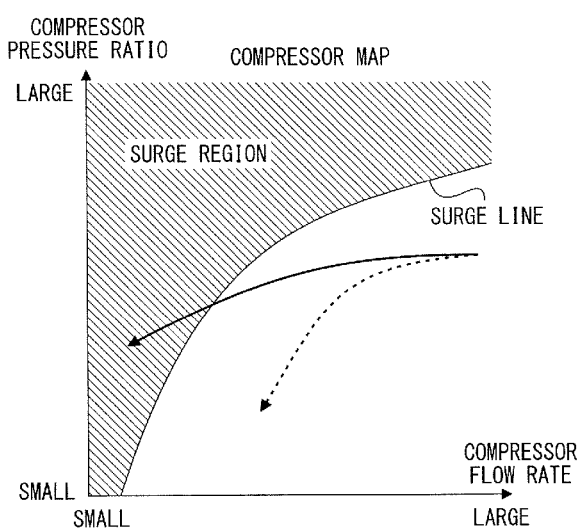
FIG. 2 describes a surge region in a compressor map.

FIG. 2 describes a surge region in a compressor map, in which a horizontal axis denotes a flow rate in the compressor 138a and a vertical axis denotes a pressure ratio of the pressure at the outlet to a pressure at an inlet of the compressor 138a. In the engine system 100, narrowing down the variable nozzle 138c makes it possible to increase the pressure at the outlet of the compressor 138a, i.e., the ratio of the pressure at the outlet to the pressure at the inlet of the compressor 138a, even when the flow velocity of the exhaust gas in the exhaust pipe 146 is low as described above. On the other hand, when the accelerator opening degree is lowered while the variable nozzle 138c is still narrowed down, i.e., while the pressure ratio of the compressor 138a is still high, the flow rate of the intake air that passes through the compressor 138a decreases significantly as denoted by a solid arrow in FIG. 2, falling within the surge region on the compressor map as hatched in FIG. 2. In other words, a surge noise is easily generated as a tradeoff for maintaining the acceleration performance and the combustion efficiency by narrowing down the variable nozzle 138c.

Also, there are some cases where the throttle valve 144 may be narrowed down upon the regeneration of the DPF or upon the starting of the engine 108 as described above, which means that the flow fate of the intake air that passes through the compressor 138a decreases even further. Such a situation makes it easier to fall within the surge region on the compressor map, and makes it more difficult to escape from the surge region as well.

To address these, the implementation involves identifying a current driving state of a vehicle on which the engine system 100 is mounted, and determining whether a possibility of the generation of the surge noise is high, based on the driving state of the vehicle (hereinafter simply referred to as a "vehicle driving state") and an operating state of the engine 108 (hereinafter simply referred to as an "engine operating state"). Upon determining that the possibility of the generation of the surge noise is high, the implementation involves performing a process of suppressing the generation of the surge noise. This makes it possible to suppress the generation of the surge noise as illustrated by a dashed arrow in FIG. 2, while improving the acceleration performance and the combustion efficiency by means of the turbocharger 138, especially by the variable nozzle 138c thereof. In the following, a description is given in detail of a determination on a surge condition as a condition under which the surge noise is generated, and of the process of suppressing the generation of the surge noise that may be performed thereafter.

The driving state identifier 188 identifies the current vehicle driving state among a plurality of mutually-different vehicle driving states. Here, the implementation is described with reference to a non-limiting example in which the vehicle driving states include four vehicle driving states that satisfy their respective corresponding vehicle driving conditions. The four vehicle driving states may be, for example but not limited to, a racing state, a shift-changing state, a coast state, and a non-lockup drive-shaft-connected state that satisfy their respective corresponding vehicle driving conditions of a racing condition, a shift-changing condition, a coast condition, and a non-lockup drive-shaft-connected condition.

The racing state may be equivalent to so-called revving of the engine 108, and may refer to a state in which the racing condition is satisfied. For example, the racing condition may be a condition in which the shift position of the transmission is at a neutral position and the vehicle is stopped (i.e., the vehicle speed is nearly equal to zero (vehicle speed≈0)). The driving state identifier 188 may determine whether the vehicle driving state is the racing state, based on outputs of the shift position sensor 164 and the vehicle speed sensor 166.

The shift-changing state may be a state in which the shift position is being changed. The shift-changing state may refer to a state in which the shift-changing condition is satisfied, which may be, for example, a condition in which the shift position of the transmission is at the neutral position and the vehicle is traveling (i.e., the vehicle speed is not equal to zero (vehicle speed≠0)). The driving state identifier 188 may determine whether the vehicle driving state is the shift-changing state, based on the outputs of the shift position sensor 164 and the vehicle speed sensor 166.

The coast state may be equivalent to so-called inertial traveling, and may refer to a state in which the coast condition is satisfied. For example, the coast condition may be a condition in which a lock-up clutch is locked up if the vehicle is an automatic transmission (AT) vehicle including, without limitation, a continuously-variable transmission (CVT), or may be a condition in which the shift position of the transmission is at any position other than the neutral position (such as a forward position and a reverse position) if the vehicle is a manual transmission (MT) vehicle. The driving state identifier 188 may determine whether the vehicle driving state is the coast state, based on vehicle information which the ECU 170 retains (such as information on whether the vehicle is the AT vehicle or the MT vehicle) and on the output of the shift position sensor 164.

The non-lockup drive-shaft-connected state may be based on the assumption of a so-called stall state, and may refer to a state in which the non-lockup drive-shaft-connected condition is satisfied. The stall state may refer to a state in which an accelerator is pressed down while a brake pedal is pressed and thus the number of revolutions of an engine is made high in the AT vehicle. For example, the non-lockup drive-shaft-connected condition may be a condition in which the vehicle is the AT vehicle, the lock-up clutch is not locked up, and the shift position of the transmission is at any position other than the neutral position. The driving state identifier 188 may determine whether the vehicle driving state is the non-lockup drive-shaft-connected state, based on the vehicle information which the ECU 170 retains (including the information on whether the vehicle is the AT vehicle or the MT vehicle), the output of the shift position sensor 164, the number of revolutions of the engine 108 derived by the signal receiver 180, and an output of the drive shaft revolution sensor 168. A determination as to whether the lock-up clutch is locked up may be made based on whether a difference between the number of revolutions of the engine 108 and the number of revolutions of the drive shaft (i.e. the number of revolutions of the drive shaft located downstream of the lock-up clutch) acquired by the drive shaft revolution sensor 168 is zero, or equal to or less than the predetermined number of revolutions. Also, in addition to the condition described above, the determination as to whether the vehicle driving state is the non-lockup drive-shaft-connected state may be performed in consideration of the vehicle speed acquired by the vehicle speed sensor 166 and a state of pressing down of the brake pedal. In other words, the vehicle driving state may be determined as the non-lockup drive-shaft-connected state, when the vehicle speed is zero and the brake pedal is pressed down, in addition to satisfaction of the condition described above.

Upon satisfaction of one of the vehicle driving conditions, i.e., the racing condition, the shift-changing condition, the coast condition, and the non-lockup drive-shaft-connected condition, the driving state identifier 188 may identify that the current vehicle driving state is the vehicle driving state that corresponds to the satisfied one of the vehicle driving conditions. When the vehicle driving conditions are not satisfied, the driving state identifier 188 may identify that the current vehicle driving state is any other vehicle driving state.

The surge determiner 190 determines whether the surge condition as a condition under which the surge noise is generated, i.e., under which the possibility of the generation of the surge noise is high, is satisfied, based on the vehicle driving state identified by the driving state identifier 188 and the engine operating state. The implementation may include an intake manifold pressure and the fuel injection amount change rate as non-limiting parameters that indicate the engine operating state. The intake manifold pressure may indicate a load of the engine 108. The fuel injection amount change rate may indicate a level of a change in operation of the accelerator, and may become high when the accelerator is released suddenly. The surge determiner 190 may compare the parameters indicating the engine operating state with their respective predetermined values to determine whether the surge condition is satisfied. More specifically, the surge determiner 190 may compare the intake manifold pressure and the fuel injection amount change rate with their respective thresholds (i.e., an intake manifold pressure threshold and a fuel threshold), and may determine that the surge condition is satisfied when the intake manifold pressure is equal to or greater than the intake manifold pressure threshold (i.e., a predetermined pressure), and the fuel injection amount change rate represented by an absolute value is equal to or greater than the fuel threshold (i.e., equal to or greater than a predetermined change rate in which the fuel injection amount changes decreasingly). The thresholds, i.e., the intake manifold pressure threshold and the fuel threshold, may be provided corresponding to each of the vehicle driving states.

Note that the condition under which the surge noise is generated varies depending on each of the vehicle driving states. Hence, the intake manifold pressure thresholds may be set to respective values that are different from each other according to the vehicle driving states. Likewise, the fuel thresholds may be set to respective values that are different from each other according to the vehicle driving states. In addition thereto, the intake manifold pressure thresholds may be different according to the number of revolutions of the engine 108 depending on the vehicle driving states, and the fuel thresholds may be different according to the intake manifold pressure.

Figure 3A:
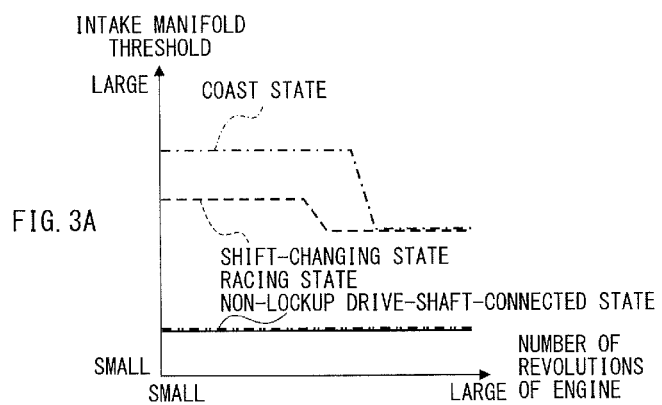
FIGS. 3A and 3B respectively describe an intake manifold threshold and a fuel threshold.
Figure 3B:
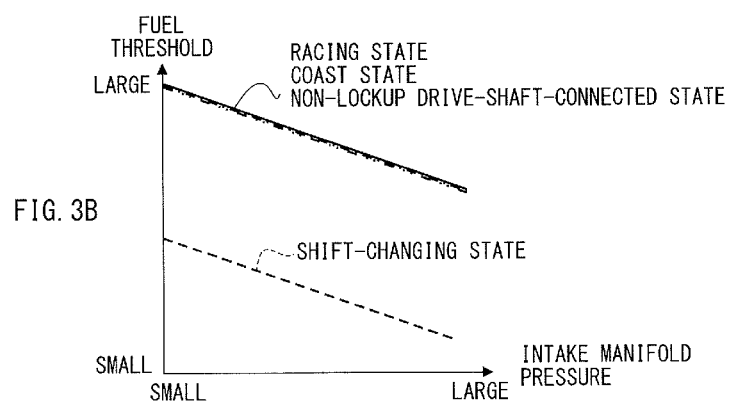

FIGS. 3A and 3B respectively describe the intake manifold threshold and the fuel threshold, in which a horizontal axis and a vertical axis in FIG. 3A respectively denote the number of revolutions of the engine 108 and the intake manifold threshold, and a horizontal axis and a vertical axis in FIG. 3B respectively denote the intake manifold pressure and the fuel threshold. In FIGS. 3A and 3B, the racing state, the shift-changing state, the coast state, and the non-lockup drive-shaft-connected state are respectively denoted by a solid line, a broken line, a single-dot chain line, and a two-dot chain line.

Referring to FIG. 3A, the intake manifold threshold may be provided corresponding to each of the vehicle driving states. For the shift-changing state and the coast state among the plurality of vehicle driving states, their respective intake manifold thresholds each may be varied according to the number of revolutions of the engine 108. The shift-changing state and the coast state both involve running of the vehicle and are hence more likely to lead to occurrence of an influence on the exhaust gas attributed to the later-described process of suppressing the generation of the surge noise, as compared with the racing state and the non-lockup drive-shaft-connected state that assume a situation where the vehicle is stopped. Also, a road noise or any other noise is generated when the vehicle is running, making it difficult for the surge noise to be heard as compared with the situation where the vehicle is stopped. Hence, the intake manifold thresholds for the shift-changing state and the coast state may be set higher than those for the racing state and the non-lockup drive-shaft-connected state as illustrated in FIG. 3A to make it difficult to satisfy the surge condition and to thereby make it less influential to the exhaust gas. As compared with the shift-changing state, the coast state is slow in decrease in the flow rate of the intake air that passes through the compressor 138*a* per unit time upon releasing of the accelerator, making it difficult to fall within the surge region accordingly. Hence, the intake manifold threshold for the coast state may be set higher than that for the shift-changing state.

Referring to FIG. 3B, the fuel threshold may be provided corresponding to each of the vehicle driving states. Further, the fuel thresholds for the respective vehicle driving states each may be varied according to the intake manifold pressure. More specifically, the fuel threshold for the shift-changing state, in which the generation of the surge noise is most likely (especially in the shift-changing state during acceleration), is made lower than that for any other vehicle driving state to make it easier to satisfy the surge condition.

The surge determiner 190 may perform extraction of any of the intake manifold thresholds as illustrated in FIG. 3A, based on the current vehicle driving state and the number of revolutions of the engine 108, and perform extraction of any of the fuel thresholds as illustrated in FIG. 3B, based on the current vehicle driving state and the intake manifold pressure. The surge determiner 190 may determine that the surge condition is satisfied, when the current intake manifold pressure is equal to or greater than the extracted intake manifold threshold and the current fuel injection amount change rate is equal to or greater than the extracted fuel threshold. Such a configuration makes it possible to appropriately determine whether the surge condition is satisfied, while reducing an influence on any performance of the vehicle, such as, but not limited to, performance related to the exhaust gas.

Also, hysteresis characteristics may be applied to the determination on whether the surge condition is satisfied. For example, the surge determiner 190 may determine that the surge condition is satisfied when the intake manifold pressure is equal to or greater than the corresponding intake manifold threshold and the fuel injection amount change rate is equal to or greater than the corresponding fuel threshold, and may determine that the surge condition is no longer satisfied when the intake manifold pressure or the fuel injection amount change rate becomes lower than its corresponding threshold. In this regard, the surge determiner 190 may refrain from immediately determining that the surge condition is no longer satisfied even when the intake manifold pressure becomes less than the corresponding intake manifold threshold or even when the fuel injection amount change rate becomes less than the corresponding fuel threshold. Once the intake manifold pressure reaches a predetermined threshold that is smaller than the corresponding intake manifold threshold, or once the fuel injection amount change rate reaches a predetermined threshold that is smaller than the corresponding fuel threshold, the surge determiner 190 may determine that the surge condition is no longer satisfied. This makes it possible to prevent occurrence of chattering that may occur in a region near the intake manifold threshold or near the fuel threshold.

Upon the determination by the surge determiner 190 that the surge condition is satisfied, the variable nozzle controller 184 so controls the opening degree of the variable nozzle 138c as to be varied in an open direction, i.e., in a direction in which the opening degree is increased, based on the current vehicle driving state and the number of revolutions of the engine 108.

Usually, as described above, the variable nozzle 138c is often narrowed down by the variable nozzle controller 184 to increase the pressure at the outlet of the compressor 138a, i.e., to increase the acceleration performance. Here, the variable nozzle controller 184 increases the opening degree of the variable nozzle 138c to prevent the generation of the surge noise, upon the determination by the surge determiner 190 that the surge condition is satisfied.

Figure 4A:
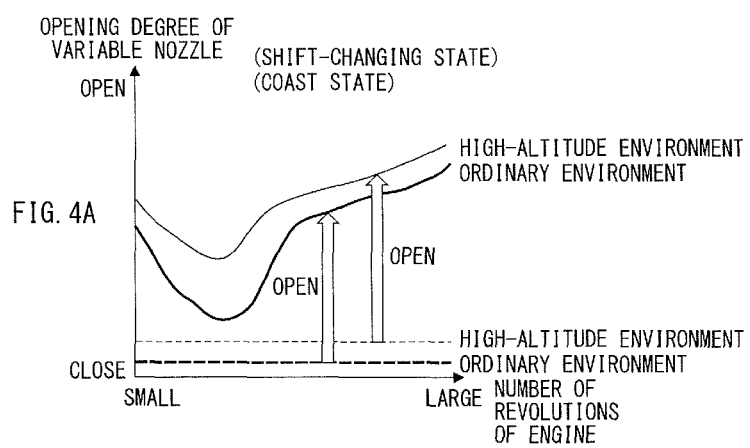
FIGS. 4A and 4B each describe an opening degree of a variable nozzle upon determination that a surge condition is satisfied.
Figure 4B:
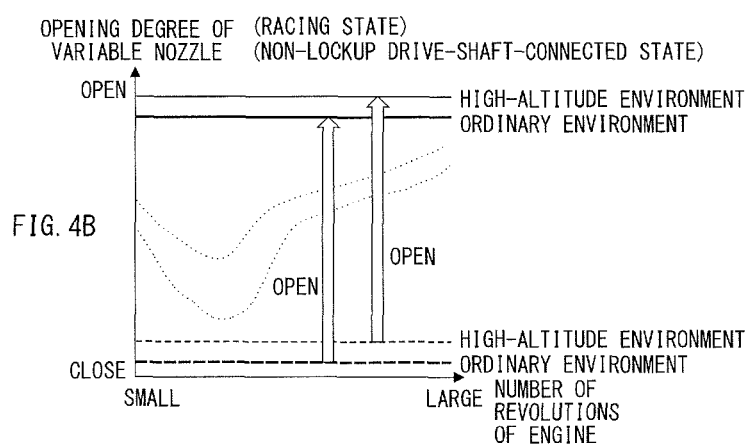

FIGS. 4A and 4B each describe the opening degree of the variable nozzle 138c upon the determination that the surge condition is satisfied. For example, when the current vehicle driving state is the shift-changing state or the coast state, the variable nozzle controller 184 may increase, based on the number of revolutions of the engine 108 as denoted by dashed lines in FIG. 4A, the opening degree of the variable nozzle 138c from a closed state of the variable nozzle 138c as denoted by white arrows in FIG. 4A. When the current vehicle driving state is the racing state or the non-lockup drive-shaft-connected state, the variable nozzle controller 184 may increase, irrespective of the number of revolutions of the engine 108 as denoted by dashed lines in FIG. 4B, the opening degree of the variable nozzle 138c from the closed state of the variable nozzle 138c as denoted by white arrows in FIG. 4B. Also, the opening degree of the variable nozzle 138c may be set higher in the racing state or the non-lockup drive-shaft-connected state than the opening degree in the shift-changing state or the coast state. One reason is that a limitation may be set on the opening degree of the variable nozzle 138c in the shift-changing state or the coast state in which the vehicle is running, for purpose of keeping drivability from decreasing, whereas no limitation may be set on the opening degree of the variable nozzle 138c (i.e., the variable nozzle 138c may be fully opened) in the racing state or the non-lockup drive-shaft-connected state in which stopping of the vehicle is assumed and hence the decrease in the drivability is of no concern.

Further, as illustrated in FIGS. 4A and 4B, the opening degree of the variable nozzle 138c may be set to any of mutually-different values, depending on external environment. Non-limiting examples of the external environment may include ordinary environment and high-altitude environment that may be highland or low in temperature. More specifically, the opening degree of the variable nozzle 138c under the high-altitude environment may be set larger than the opening degree of the variable nozzle 138c under the ordinary environment. This takes into consideration that a density of air is low in highland and hence the number of revolutions of the turbine 138b increases easily, and that the density is low at a low temperature and hence an in-cylinder pressure increases easily. For example, the ECU 170 may make a determination as to whether the external environment is the high-altitude environment, based on an output of an unillustrated atmospheric pressure sensor, an output of an unillustrated intake air temperature sensor, or both.

The surge determiner 190 may determine that the surge condition is no longer satisfied, following the decrease in the intake manifold pressure or the fuel injection amount change rate from a state that has been determined by the surge determiner 190 as satisfying the surge condition. Upon the determination by the surge determiner 190 that the surge condition is no longer satisfied, the variable nozzle controller 184 may so control the opening degree of the variable nozzle 138c as to be varied in a close direction to thereby return the opening degree of the variable nozzle 138c to the opening degree that is immediately prior to the determination that the surge condition is satisfied. Here, the opening degree of the variable nozzle 138c may be gradually varied based on a gradually-decreasing curve that involves a predetermined rate of change, i.e., a gradient, without varying the opening degree at once. The gradually-decreasing curve may be a primary curve, or any of curves of plural orders. Such a configuration allows for a smooth transition to an ordinary control, making it possible to effectively suppress the generation of the surge noise resulting from a sudden variation in the opening degree of the variable nozzle 138c.

Upon the satisfaction of the surge condition, the throttle controller 186 may so control the opening degree of the throttle valve 144 as to be varied in an open direction, based on the number of revolutions of the engine 108. The throttle valve 144 may adjust the flow passage width of the intake pipe 142 that may be in communication with the combustion chamber 118.

There are some cases, as described above, where the throttle controller 186 may adjust the throttle valve 144 to the opening degree that corresponds to the number of revolutions of the engine 108 to perform the combustion and the regeneration of the particulates in the DPF and to reduce the amount of NOx by increasing the flow rate in the EGR flow passage 150. When the surge determiner 190 determines that the surge condition is satisfied under such a situation, the throttle controller 186 may control the throttle valve 144 to be varied in the open direction to prevent the generation of the surge noise.

Figure 5:
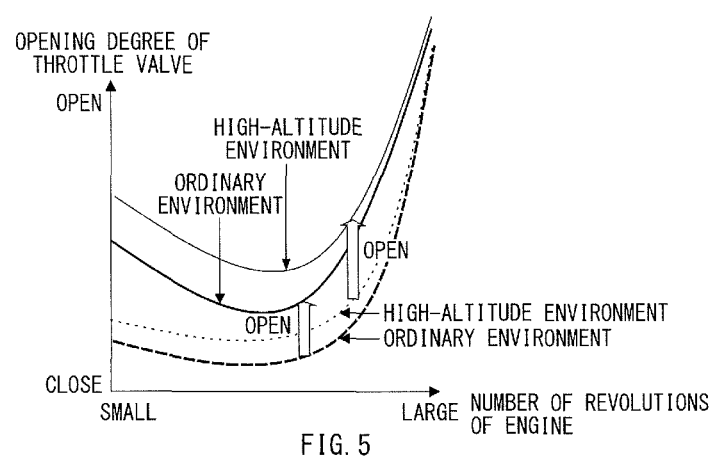
FIG. 5 describes an opening degree of a throttle valve.

FIG. 5 describes the opening degree of the throttle valve 144. For example, even when the throttle valve 144 is relatively closed as denoted by dashed lines in FIG. 5 for purpose of regenerating the DPF or increasing the flow rate in the EGR flow passage 150, the throttle controller 186 may increase, based on the number of revolutions of the engine 108, the opening degree of the throttle valve 144 as denoted by white arrows in FIG. 5, upon the determination that the surge condition is satisfied. Here, as with one example illustrated in FIGS. 4A and 4B, the opening degree of the throttle valve 144 may be set to any of mutually-different values, depending on the external environment, e.g., depending on the ordinary environment and the high-altitude environment. More specifically, in view of the density of air which is low in highland, the opening degree of the throttle valve 144 under the high-altitude environment may be set larger than the opening degree of the throttle valve 144 under the ordinary environment.

Also, upon the determination by the surge determiner 190 that the surge condition is no longer satisfied following the decrease in the intake manifold pressure or the fuel injection amount change rate from the state that has been determined by the surge determiner 190 as satisfying the surge condition, the throttle controller 186 may so control the opening degree of the throttle valve 144 as to be varied in a close direction to thereby return the opening degree of the throttle valve 144 to the opening degree that is immediately prior to the determination that the surge condition is satisfied. Here, as with one example of the variable nozzle 138c, the opening degree of the throttle valve 144 may be gradually varied based on a gradually-decreasing curve that involves a predetermined rate of change, i.e., a gradient, without varying the opening degree of the throttle valve 144 at once.

[Method of Suppressing Surge Noise]

In the following, a description is given of specific but non-limiting processes of a method of suppressing the surge noise using the engine system 100.

Figure 6:
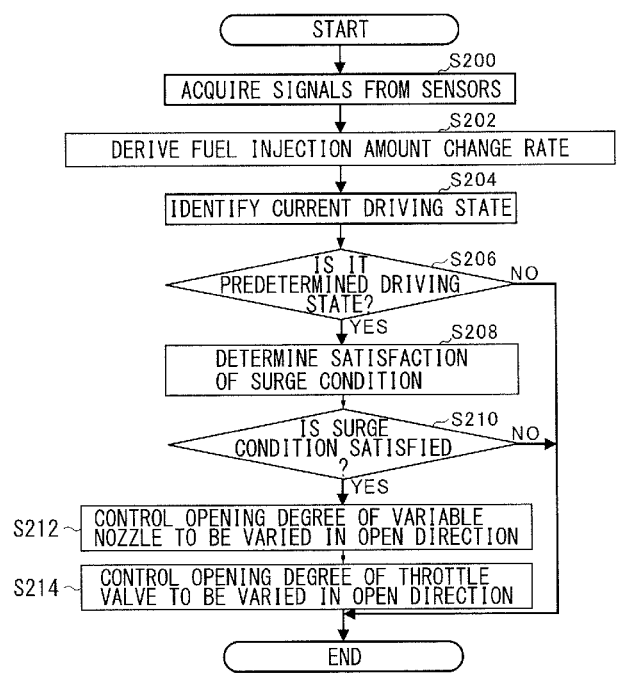
FIG. 6 is a flowchart illustrating a process flow of a method of suppressing a surge noise.

FIG. 6 is a flowchart illustrating a process flow of the method of suppressing the surge noise. In the implementation, the method of suppressing the surge noise may be repeatedly carried out based on interruption handling that may be executed at predetermined time intervals.

First, the signal receiver 180 may acquire the signals indicating the respective detection values obtained from the intake manifold pressure sensor 160, the crank angle sensor 162, the shift position sensor 164, the vehicle speed sensor 166, and the drive shaft revolution sensor 168, to derive the number of revolutions of the engine 108 (S200). Then, the fuel controller 182 may derive the fuel injection amount change rate, based on the injected amount of the fuel (S202). Then, the driving state identifier 188 may determine whether one of the plurality of vehicle driving conditions (i.e., the racing condition, the shift-changing condition, the coast condition, and the non-lockup drive-shaft-connected condition) is satisfied. Upon determining that one of the vehicle driving conditions is satisfied, the driving state identifier 188 may identify one of the vehicle driving states (i.e., the racing state, the shift-changing state, the coast state, and the non-lockup drive-shaft-connected state) which corresponds to the determined vehicle driving condition as the current vehicle driving state (S204).

The surge determiner 190 may determine whether one of the predetermined vehicle driving states (i.e., the racing state, the shift-changing state, the coast state, and the non-lockup drive-shaft-connected state) is identified as the vehicle driving state (S206). The method of suppressing the surge noise may be ended when the determination is made by the surge determiner 190 that one of the predetermined vehicle driving states is not identified, i.e., that the vehicle driving state is identified as any other vehicle driving state (NO in S206). When one of the predetermined vehicle driving states is identified (YES in S206), the surge determiner 190 determines whether the surge condition is satisfied, based on the identified vehicle driving state and the engine operating state that may involve the intake manifold pressure and the fuel injection amount change rate (S208).

Then, confirmation is made as to whether the determination that the surge condition is satisfied has been made (S210). The method of suppressing the surge noise may be ended when it is confirmed that the surge condition has not been determined as being satisfied (NO in S210). When it is confirmed that the surge condition has been determined as being satisfied (YES in S210), the variable nozzle controller 184 so controls the opening degree of the variable nozzle 138c as to be varied in the open direction, based on the identified vehicle driving state and the number of revolutions of the engine 108 (S212), and the throttle controller 186 may so control the opening degree of the throttle valve 144 as to be varied in the open direction, based on the number of revolutions of the engine 108 (S214), following which the method of suppressing the surge noise may be ended.

According to the engine system 100 in the foregoing implementation, it is possible to suppress the generation of the surge noise effectively while suppressing an influence on any performance of the vehicle, such as, but not limited to, performance related to the exhaust gas and drivability.

Also, the opening degrees of the variable nozzle 138c and the throttle valve 144 are appropriately set based on one or both of the vehicle driving state and the number of revolutions of the engine 108 even when the opening degrees thereof are to be increased to suppress the generation of the surge noise. Hence, it is possible to maintain the acceleration performance and the combustion efficiency and to maintain a temperature of the exhaust gas, while suppressing the generation of the surge noise.

Further, the implementation suppresses the generation of the surge noise with use of the existing variable nozzle 138c and throttle valve 144 without requiring additional hardware such as, but not limited to, a separate mechanism that releases a pressure of the air having passed through the compressor 138a. Hence, it is possible to prevent an increase in mechanism weight, occupied volume, costs, or any cost required for a change in design.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, although a description has been given of the foregoing implementation with reference to the diesel engine as one example of the engine 108, any implementation of the technology is applicable to a gasoline engine as well without being limited thereto. In an implementation where the engine 108 is the gasoline engine, the level of the change in operation of the accelerator may be based on a rate of change in the opening degree of the throttle valve 144, instead of the fuel injection amount change rate.

The invention claimed is:

1. An engine system control apparatus of an engine system, the engine system being mounted on a vehicle and including an engine and a turbocharger, the engine including a combustion chamber, the turbocharger including a turbine, a compressor, and a variable nozzle, the turbine being in communication with the combustion chamber and being rotated by exhaust gas exhausted from the combustion chamber, the compressor being rotated integrally with the turbine and pressurizing intake air to deliver the pressurized intake air to the combustion chamber, and the variable nozzle being provided in an exhaust gas flow passage of the turbine and varying flow passage area of the exhaust gas, the engine system control apparatus comprising:
- a driving state identifier configured to identify a driving state of the vehicle from a plurality of driving states;
- a surge determiner configured to determine whether a surge condition as a condition under which a surge noise is generated is satisfied, based on the identified driving state of the vehicle and an operating state of the engine; and
- a variable nozzle controller configured to control, based on the identified driving state of the vehicle and the operating state of the engine, an opening degree of the variable nozzle to be varied in an open direction, upon determination by the surge determiner that the surge condition is satisfied,
- wherein the plurality of driving states of the vehicle include at least one vehicle stop state where the vehicle is stopped and at least one vehicle running state where the vehicle is running.

2. The engine system control apparatus according to claim 1, wherein
- the driving states of the vehicle further include input values for a pressure of an intake manifold that is in communication with the combustion chamber, and input values for a fuel injection amount change rate of an injector that injects a fuel into the combustion chamber, and
- the surge determiner determines that the surge condition is satisfied, when the pressure of the intake manifold is equal to or greater than a predetermined pressure and the fuel injection amount change rate of the injector is equal to or greater than a predetermined change rate.

3. The engine system control apparatus according to claim 2, wherein the predetermined pressure has mutually-different values that are set according to a number of revolutions of the engine.

4. The engine system control apparatus according to claim 3, wherein the predetermined change rate has mutually-different values that are set according to the pressure of the intake manifold.

5. The engine system control apparatus according to claim 2, wherein the predetermined change rate has mutually-different values that are set according to the pressure of the intake manifold.

6. The engine system control apparatus according to claim 1, wherein
- the surge determiner compares a parameter indicating the operating state of the engine with a predetermined value to determine whether the surge condition is satisfied, and
- the predetermined value has mutually-different values that are set according to the respective driving states of the vehicle.

7. The engine system control apparatus according to claim 1, wherein
- the surge determiner compares a parameter indicating the operating state of the engine with a predetermined value to determine whether the surge condition is satisfied, and
- a predetermined value for the at least one vehicle running state is set so as to make it difficult to satisfy the surge condition, compared to a predetermined value for the at least one vehicle stop state.

8. The engine system control apparatus according to claim 1, wherein the at least one vehicle stop state comprises a revving of the engine.

9. A vehicle, comprising:
- an engine system; and
- an engine system control apparatus of the engine system, the engine system including:
- an engine including a combustion chamber; and
- a turbocharger including a turbine, a compressor, and a variable nozzle, the turbine being in communication with the combustion chamber and being rotated by exhaust gas exhausted from the combustion chamber, the compressor being rotated integrally with the turbine and pressurizing intake air to deliver the pressurized intake air to the combustion chamber, and the variable nozzle being provided in an exhaust gas flow passage of the turbine and varying flow passage area of the exhaust gas, and
the engine system control apparatus including:
- a driving state identifier configured to identify a driving state of the vehicle from a plurality of driving states;
- a surge determiner configured to determine whether a surge condition as a condition under which a surge noise is generated is satisfied, based on the identified driving state of the vehicle and an operating state of the engine; and
- a variable nozzle controller configured to control, based on the identified driving state of the vehicle and the operating state of the engine, an opening degree of the variable nozzle to be varied in an open direction, upon determination by the surge determiner that the surge condition is satisfied.

10. An engine system control apparatus of an engine system, the engine system being mounted on a vehicle and including an engine and a turbocharger, the engine including a combustion chamber, the turbocharger including a turbine, a compressor, and a variable nozzle, the turbine being in communication with the combustion chamber and being rotated by exhaust gas exhausted from the combustion chamber, the compressor being rotated integrally with the turbine and pressurizing intake air to deliver the pressurized intake air to the combustion chamber, and the variable nozzle being provided in an exhaust gas flow passage of the turbine and varying flow passage area of the exhaust gas, the engine system control apparatus comprising:
- a driving state identifier configured to identify a driving state of the vehicle from a plurality of driving states;
- a surge determiner configured to determine whether a surge condition as a condition under which a surge noise is generated is satisfied, based on the identified driving state of the vehicle and an operating state of the engine; and
- a variable nozzle controller configured to control, based on the identified driving state of the vehicle and the operating state of the engine, an opening degree of the variable nozzle to be varied in an open direction, upon determination by the surge determiner that the surge condition is satisfied,
- wherein the plurality of driving states of the vehicle at least include a shift-changing state and a coast state.

11. The engine system control apparatus according to claim 10, wherein the surge determiner compares a parameter indicating the operating state of the engine with a predetermined value to determine whether the surge condition is satisfied, and the predetermined value has mutually-different values that are set according to the respective driving states of the vehicle.

12. The engine system control apparatus according to claim 10, wherein the surge determiner compares a parameter indicating the operating state of the engine with a predetermined value to determine whether the surge condition satisfied, and a predetermined value for the coast state is set so as to make it difficult to satisfy the surge condition, compared to a predetermined value for the shift-changing state.

13. The engine system control apparatus according to claim 10, wherein the driving states of the vehicle further include a driving state in which there is a revving of the engine.

14. The engine system control apparatus according to claim 10, wherein the driving states of the vehicle further include input values for a pressure of an intake manifold that is in communication with the combustion chamber, and input values for a fuel injection amount change rate of an injector that injects a fuel into the combustion chamber, and the surge determiner determines that the surge condition is satisfied, when the pressure of the intake manifold is equal to or greater than a predetermined pressure and the fuel injection amount change rate of the injector is equal to or greater than a predetermined change rate.

15. The engine system control apparatus according to claim 14, wherein the predetermined pressure has mutually-different values that are set according to a number of revolutions of the engine.

16. The engine system control apparatus according to claim 15, wherein the predetermined change rate has mutually-different values that are set according to the pressure of the intake manifold.

17. The engine system control apparatus according to claim 14, wherein the predetermined change rate has mutually-different values that are set according to the pressure of the intake manifold.

* * * * *